United States Patent Office 3,034,902
Patented May 15, 1962

3,034,902
BLUE CHEESE FLAVORING COMPOSITION
Vincent S. Bavisotto, Whitefish Bay, Wis., assignor, by mesne assignments, to Chas. Pfizer & Co., Inc., New York, N.Y., a corporation of Delaware
No Drawing. Filed Oct. 19, 1960, Ser. No. 63,504
6 Claims. (Cl. 99—140)

This invention relates generally to an improved flavoring composition. More particularly this invention relates to a composition which is capable of imparting a blue cheese flavor and aroma to various foods such as salad dressing, mayonnaise, cheese dip preparations, crackers, rolls, sauces, etc.

Blue cheese is widely used and enjoyed because of its distinctive aroma and taste. Blue cheese is used alone or as an additive to other food products. For many years all of the blue cheese consumed in this country was imported because the details of this difficult production process were maintained in secrecy by foreign producers. Blue cheese is now produced in this country but the production process is rather involved and blue cheese itself relatively expensive. Many food products have had their flavor and aroma desirably enhanced by the direct incorporation of blue cheese. However, such direct incorporation methods often leave much to be desired insofar as cost, stability and ease of incorporation are concerned. An examination of a number of the commercial blue cheese salad dressings by taste panels has shown that for the most part the blue cheese flavor in most of these salad dressings was found to be extremely mild to almost indistinguishable.

It is therefore an object of this invention to provide a blue cheese aroma and flavor composition by combining a plurality of pure or relatively pure chemical compounds.

A further object is to prepare a composition which can be conveniently added to salad dressings, mayonnaises, cheese dip preparations, crackers, rolls, sauces, etc. to impart a blue cheese flavor and aroma thereto.

The use of natural ingredients to produce blue cheese flavor and aroma requires specific curing periods in order to produce a flavor and aroma of a desired intensity. The intensity of the flavor and aroma is dependent on the curing period, a short period for very mild and a long period for a very sharp flavor and aroma. When the cheese is finally marketed, the intensity of the blue cheese flavor and aroma will continue to increase until the product is finally consumed. Where a high concentration of natural blue cheese is employed, the final product has been found to have a poor consistency, an undesirably high fat content and a poor appearance. It can be seen that where the cheese is kept in storage or on the shelf for a long period of time, the above changes will cause a variation in the intensity of the flavor and aroma of the final product.

Another object of this invention is to provide a flavor and aroma compound for blue cheese which will not vary in intensity over a long period of time.

A further object of this invention is to provide a flavor and aroma supplement for natural blue cheese to bring the blue cheese flavor and aroma up to a desirable and uniform level of intensity.

Other objects and advantages will be apparent after reading the following description.

This invention broadly involves the preparation of a composition which closely resembles the flavor and aroma of blue cheese. A specific blue cheese composition encompassed by this invention can be illustrated by the combination of ingredients in the following concentration:

Concentrate A

| | Grams |
|---|---|
| Acetone | 3.0 |
| 2-pentanone | 3.0 |
| 2-heptanone | 1.5 |
| 2-octanone | 1.0 |
| 2-nonanone | 1.0 |
| 2-undecanone | 0.5 |
| Ethanol | 1.0 |
| Acetaldehyde | 0.04 |
| Stabilized cottonseed oil | 80.0 |

Concentrate B

| | Grams |
|---|---|
| Butyric acid | 16.8 |
| Caproic acid | 24.1 |
| Caprylic acid | 5.7 |
| Capric acid | 15.5 |
| Stabilized cottonseed oil | 27.9 |

The cottonseed oil used in concentrates A and B was an edible, refined grade, stabilized with the antioxidant NDGA #10A (1:2000). Additional ingredients such as antioxidants, coloring agents, dispersing agents, etc. could, of course, be added to the above concentrations if desired.

The above concentrations can be added to any food to which it is desired to impart a blue cheese flavor and aroma. The intensity of the flavor and aroma can be varied by combining the concentrations in the following relation to produce the indicated flavor and aroma:

Sharp (fully-ripened blue cheese flavor) _____ 0.9 part A+0.45 part B to 100 parts by weight of the product to be flavored.

Moderately strong _____ 0.55 part A+0.27 part B to 100 parts by weight of the product to be flavored.

Medium _____ 0.22 part A+0.22 part B to 100 parts by weight of the product to be flavored.

Mild _____ 0.036 part A+0.22 part B to 100 parts by weight of the product to be flavored.

Very mild _____ 0.018 part A to 0.22 part B to 100 parts by weight of the product to be flavored.

These ratios may be varied to achieve a preferred flavor and aroma characteristic. Once the concentrations have been mixed in the proportions indicated, the flavor and aroma will remain the same for an indefinite period of time. The stability of this formula makes the blue cheese flavor and aroma composition a very desirable ingredient for commercial application since the flavor and aroma will have the same intensity for an indefinite period of time.

It is believed that this invention can be suitably illustrated by a small number of specific claims. Even though these claims are specific in nature, those skilled in the art to which this invention pertains will recogize that there are obvious equivalents for the specific materials recited therein. Some of these obvious equivalents will immediately occur to one skilled in the art while other obvious equivalents could be readily ascertained upon rather simple, routine, non-inventive experimentation. Certainly no invention would be involved in substituting one or more of such obvious equivalents for the materials specifically recited in the claims and no invention would be involved in either varying the ratio of ingredients or omitting ingredients in the concentrations where such an omission would result in a loss of flavor or aroma. I intend that all such obvious equivalents be encompassed within the scope of this invention and patent grant in accordance with the well established doctrine of equivlaents, as well as changed proportions of the ingredients which do not render the composition unsuitable for the disclosed purposes.

I claim:

1. A flavoring composition having the flavor and aroma of blue cheese which comprises a first concentrate including:

| | Parts by weight |
|---|---|
| Acetone | 3 |
| 2-pentanone | 3 |
| 2-heptanone | 1.5 |
| 2-octanone | 1.0 |
| 2-nonanone | 1.0 |
| 2-undecanone | 0.5 |
| Ethanol | 1.0 |
| Acetaldehyde | 0.04 |
| Stabilized cottonseed oil | 80.0 | and a second concentrate including

| | Parts by weight |
|---|---|
| Butyric acid | 16.8 |
| Caproic acid | 24.1 |
| Caprylic acid | 5.7 |
| Capric acid | 15.5 |
| Stabilized cottonseed oil | 27.9 | with between 0.018 and 0.9 part by weight of the first concentrate and between 0.22 and 0.45 part by weight of the second concentrate combined with 100 parts by weight of a product to be flavored.

2. A flavoring composition according to claim 1 wherein 0.9 part of the first concentrate and 0.45 part of the second concentrate are combined with 100 parts by weight of the product to be flavored to produce a fully-ripened blue cheese flavor and aroma.

3. A flavoring composition according to claim 1 wherein 0.55 part of the first concentrate and 0.27 part of the second concentrate are combined with 100 parts by weight of the product to be flavored to produce a moderately sharp flavor and aroma.

4. A flavoring composition according to claim 1 wherein 0.22 part of the first concentrate and 0.22 part of the second concentrate are combined with 100 parts by weight of the product to be flavored to produce a medium blue cheese flavor and aroma.

5. A flavoring composition according to claim 1 wherein 0.036 part of the first concentrate and 0.22 part of the second concentrate are combined with 100 parts by weight of the product to be flavored to produce a mild blue cheese flavor and aroma.

6. A flavoring composition according to claim 1 wherein 0.018 part of the first concentrate and 0.22 part of the second concentrate are combined with 100 parts by weight of the product to be flavored to produce a very mild blue cheese flavor and aroma.

References Cited in the file of this patent

"Science News Letter," Apr. 19, 1952, page 249.
"Synthetic Food Adjuncts," by Jacobs, D. Van Nostrand Company, Inc., 250 Fourth Avenue, New York, 1947, pages 80, 144, 145, 152–154 and 294.